March 31, 1942.  H. L. BLOOD ET AL  2,277,950
OFFSETTING ARRANGEMENT FOR BORING TOOLS AND THE LIKE
Filed June 23, 1939
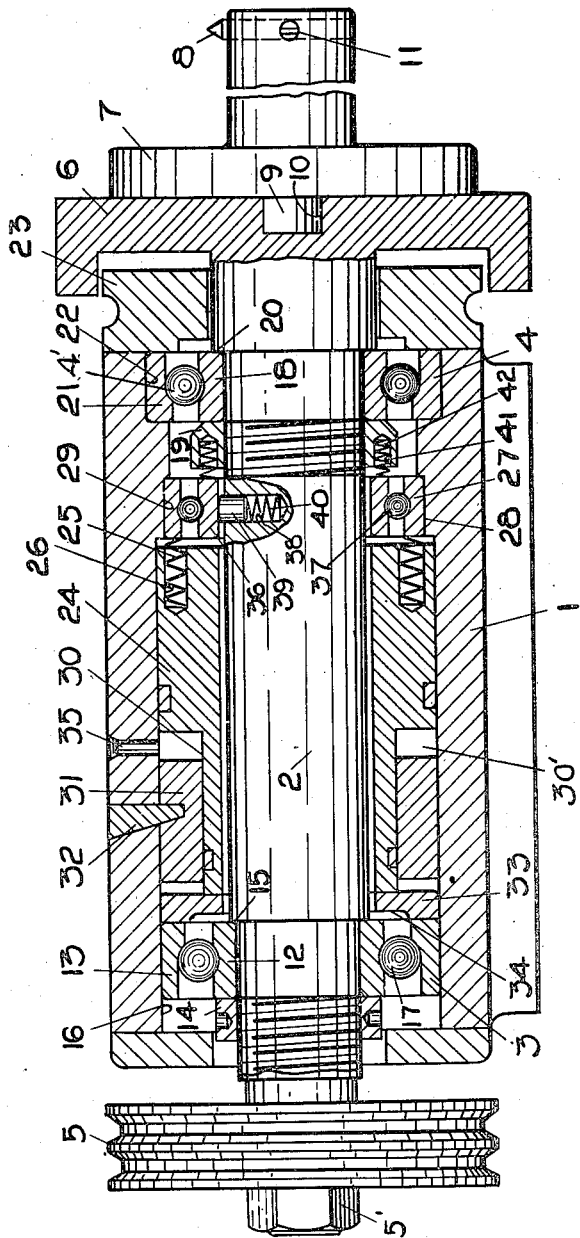
Inventors:
Charles L. Anderson
Harold L. Blood
By Geo H. Kennedy Jr
Attorney Patented Mar. 31, 1942

2,277,950

UNITED STATES PATENT OFFICE 2,277,950

OFFSETTING ARRANGEMENT FOR BORING TOOLS AND THE LIKE

Harold L. Blood and Charles L. Anderson, Worcester, Mass., assignors to The Heald Machine Company, Worcester, Mass., a corporation of Massachusetts Application June 23, 1939, Serial No. 280,761

18 Claims. (Cl. 77—58)

The present invention relates to an arrangement by which a rotary tool-carrying spindle, such as used in boring, grinding and like operations, may be offset slightly at the conclusion of such operation, so that upon withdrawal of the tool from the workpiece bore, the tool will be radially spaced from the finished surface of said bore, and will leave no mark or scratch thereon.

In the arrangement shown by Blood Patent No. 2,220,779, dated November 5, 1940, the desired lateral offsetting of the tool occurs in response to a short endwise shifting of the spindle, said lateral movement being permitted by the looseness or play afforded by the spindle's rocker shoe bearings, when said spindle is brought to rest.

The present invention utilizes a similar short endwise shifting movement of the spindle, not to produce directly the desired offset of the tool, but rather to free the spindle from the radial restraint imposed normally by its bearings, thus permitting said spindle to have a slight radial movement, under the influence of a spring or the like, acting in such direction as to offset the tool point from the finished surface of the work.

Our invention as hereinafter described, is applicable to a tool spindle whose bearings are of the anti-friction type, as distinguished from the rocker shoe type bearings employed in the aforesaid Blood Patent No. 2,220,779.

Other and further objects and advantages of the invention will more fully appear from the following detailed description taken in connection with the accompanying drawing in which the single figure is a sectional view through a tool head embodying the invention.

The boring head shown, as one embodiment of the invention, is intended for use on any of the familiar types of cutting machines which incorporate a rotary spindle for supporting either the cutting tool or the workpiece. One example of the machine to which the head shown is particularly applicable is disclosed in the Schmidt Patent No. 2,058,359, dated Oct. 20, 1936. In machines of this character the base has a reciprocable table thereon on which either the workpiece to be bored, or the boring head, is mounted, the other of these elements being positioned on a bridge secured to the base of the machine at one end of the table.

Movement of the table procures a relative axial movement between the workpiece and the boring spindle for a boring operation on the workpiece while the table is moving in one direction and a retraction of the spindle from within the workpiece bore when the table is moving in the opposite direction. Prior to reversal of the table movement, and after the boring tool has completed its action on the workpiece, the rotating boring spindle is stopped and the mechanism shown in the drawing is rendered operative to procure an offsetting movement between the tool on the end of the spindle and the finished surface of the workpiece. A mechanism for stopping the spindle rotation is fully described in the Schmidt patent, above referred to, and as any mechanism of this character may be utilized in connection with the present invention, such a mechanism need not be described in detail.

Referring to the drawing, our improved boring head has a housing 1 in which a spindle 2 is journalled, preferably in axially spaced ball bearings 3 and 4, hereinafter described in more detail. The spindle 2 carries at one end a suitable driving pulley 5 which is securely held on the spindle, as by a clamping nut 5'. The other end of the spindle has a face plate 6 integral therewith and a quill 7 carrying the boring tool 8 is mounted on the face plate, being accurately located thereon by a stud 9 on the quill extending into a bore 10 in the face plate. The boring tool 8 is mounted in the end of the quill and is held in position by a clamping screw 11.

As shown in the drawing, the ball bearing 3 adjacent the pulley end of the spindle has an inner race ring 12 and an outer race ring 13, the former being clamped on the spindle by a threaded clamping ring 14 which holds the ring against a shoulder 15 on the spindle. The outer ring 13 is axially slidable in a bore 16 of the housing 1. The ball bearing 4 adjacent the tool end of the spindle has its inner race ring 18 clamped against axial movement on the spindle by a threaded clamping ring 19 which holds the race ring against a shoulder 20 of the spindle. The outer race ring 21 of this bearing is mounted in a recess 22 in the housing and is held in position therein by a cap 23 suitably secured to the end of the housing.

The ball bearing 4 is of the so-called high angle contact type, and the raceway of its inner ring 18 is arranged to prevent any relative endwise movement between the balls 4' and said inner ring. The contact area between said balls 4' and the race of the outer ring 21 is located entirely at one side of a plane passing through the centers of the balls, so that the bearing may be pre-loaded by endwise pressure toward the left in the drawing, exerted on the balls 4' by the inner ring 18, so as to thrust said balls tightly against the contact area of outer ring 21. This ball bearing 4 is so designed that a relative axial shifting movement between the inner and outer rings in a direction opposite to the pressure which causes pre-loading of the bearing, will free the balls 4' slightly from the holding action of the outer race ring 21, and will thus permit a slight radial movement between the inner and outer rings. This slight radial movement or play of the balls 4' or play is utilized, according to our invention in obtaining the slight lateral displacement of the spindle that procures the desired back-off or retraction of the tool 8; this is accomplished as hereinafter described by a slight axial shifting of the spindle 2 that removes the pre-load from the bearing 4, and also from the bearing 3 at the other end of the spindle. Said ball bearing 3, as here shown, is also preferably of the high angle contact type, but being at the opposite end of the spindle from the tool 8, it is not necessary for this bearing, upon removal of its pre-load, to give between its race rings the radial motion or play that the bearing 4 is designed to give.

For maintaining the ball bearings 3 and 4 under pre-load and thereby assuring a vibrationless rotation of the spindle, the bore 16 has axially slidable therein an annular piston 24 which is resiliently urged toward the left by coil springs 25 arranged in recesses 26 in the end of the piston and engageable with the outer race ring 27 of a third ball bearing 28. This ring 27 is mounted in a recess 29 in the housing and is thus stationary relative thereto, so that the springs 26 function in the same way as if the ends of these springs engaged a part of the housing itself.

The left hand end of the piston 24 is reduced in diameter, as shown at 30, and said reduced portion is slidable in a sleeve 31 immovably secured within the housing bore 16 by a locking wedge 32. The extreme left hand end of the reduced piston portion 30 projects beyond the sleeve 31 and engages with a ring 33 slidable in the bore 16 and bearing against the outer race ring 13 of the ball bearing 3. This slidable ring 33 has a recess 34 by which to prevent its contact with the inner race ring 12. The springs 26 thus urge the piston 24 toward the left, thereby sliding the outer raceway 13 to the left for pre-loading the bearing 3. This same thrust of the piston tends to move the spindle, bodily, to the left, and thus puts a definite pre-load on the ball bearing 4, by virtue of the action of inner ring 18 in pressing the balls 4' against the high angle contact surface of ring 21.

The purpose of the present invention, as above stated, is to obtain a radial retraction of the boring tool from operative position prior to withdrawal of the boring tool through the bore that has just been finished by said tool. To this end the spindle must shift laterally within its housing, after being freed from the holding action of the ball bearing 4 at the tool end of said spindle. To make possible this slight lateral movement of the spindle within the housing, the pre-load on the bearings 3 and 4 is removed at the proper time, here shown by the introduction of fluid under pressure to the annular space 30' between the piston 24 and the stationary sleeve 31; for this purpose the housing 1 provides a suitable port or passage 35.

Fluid under pressure entering the space 30' at the right of the sleeve 31 moves the piston 24 to the right slightly, to overcome the pressure of the springs 25, thereby removing the pre-load on both ball bearings 3 and 4. This displacement of the springs 25 renders operative another set of lighter springs 42 which are arranged in recesses 41 of the clamping ring 19 to bear against the inner race 36 of ball bearing 28. Said springs 42, normally maintained inoperative by the stronger springs 25 are thus enabled to exert on ring 19, a pressure which moves the spindle 2 and its attached inner race rings 12 and 18 slightly to the right, this movement being permitted by the slidability in bore 16 of the outer race ring 13 of the ball bearing 3. Consequently, with the holding action of the bearing 4 thus relieved and removed by this right hand movement of its inner race ring 18, relative to its fixed outer race ring 21, it is possible for the tool end of the spindle to be moved laterally to a slight degree.

Such lateral shifting movement of the spindle is arranged to be in a direction opposite to the direction of projection of the point of the boring tool 8. To this end, in the same transverse plane as the inner race ring 36 of fixed ball bearing 28, the spindle has a radially extending bore 38 in which is arranged a plunger 39 urged outwardly by a coil spring 40. The plunger 39 is movable in a direction parallel to the boring tool 8 and projects from the spindle on the same side as the point of the boring tool. This plunger exerts a pressure tending to shift the spindle laterally within the housing, and the action of the plunger thus obtains the desired slight lateral shifting movement of the spindle, for a back-off or retraction of tool 8, when said spindle as above described is freed from the holding action of the bearing 4.

Boring heads of this general character are usually employed in boring machines that provide a relative axial feed between the tool and the workpiece to perform the boring operation, and after the tool has passed entirely over the surface to be bored the tool is withdrawn axially from the workpiece. The reciprocatory table by which this relative feed movement between the tool and work is obtained is frequently actuated by fluid under pressure and thus the port 35 in the housing 1 may be connected to the same fluid pressure system that actuates the table in such a manner that upon reversal of the table movement at the end of each boring operation, the spindle upon being brought to rest, will be automatically shifted axially to obtain the above described back-off or retraction of the boring tool 8. Such an arrangement however is not essential and it may be desirable to provide other valve means, either manually or automatically controlled, for directing fluid under pressure through the port 35 at the desired point in the machine operation.

We claim:

1. In a device of the class described, a housing, a spindle journalled therein, bearings for supporting said spindle for rotation about a predetermined axis, means for freeing said spindle from the holding action of a bearing to permit a slight lateral movement of the spindle within the housing, said means involving a relative axial movement between the spindle and at least a part of said bearing and means for shifting the spindle laterally within the housing.

2. In a device of the class described, a housing, a spindle journalled therein, ball bearings for said spindle, at least one of said bearings having an inner and outer race, means for shifting said races axially relative to each other to free the spindle from the holding action of the bearing, whereby a lateral movement of the spindle within the housing is possible, and means for shifting the spindle laterally within the housing.

3. In a device of the class described, a housing, a spindle journalled therein, bearing elements for said spindle normally held in operative position, means for procuring a relative axial movement between the spindle and a portion of said elements for freeing the spindle from the holding action of one of said bearing elements, whereby a lateral movement of the spindle within the housing is possible, and means for shifting the spindle laterally within the housing.

4. In a device of the class described, a housing, a spindle journalled therein, bearing elements for said spindle normally held in operative position, means involving a relative axial movement between the spindle and at least some of the bearing elements for freeing the spindle from the holding action of one of said bearing elements, whereby a lateral movement of the spindle within the housing is possible, and means for shifting the spindle laterally within the housing.

5. In a device of the class described, a housing, a spindle journalled in the housing, bearing elements for said spindle, resilient means for normally holding said elements in operative position, means providing for movement of at least one of the bearing elements axially against said resilient means out of normal operative position, thereby permitting an appreciable lateral movement of the spindle within the housing and means for shifting the spindle laterally within the housing.

6. In a device of the class described, a housing, a spindle journalled in the housing, bearing elements for said spindle normally held in operative position, means providing for movement of at least one of the bearing elements axially out of normally operative position, thereby permitting an appreciable lateral movement of the spindle within the housing, and means for shifting the spindle laterally within the housing.

7. In a tool head, a housing, a spindle journalled therein and having on the end thereof a laterally projecting cutting tool, bearings for said spindle, at least one of said bearings having an inner and an outer race, means for normally holding the inner and outer races in predetermined operative position, means for shifting said races relative to each other for freeing the spindle from the holding action of the bearing, whereby a lateral shifting movement of the spindle within the housing is possible, and means for shifting the spindle laterally within the housing in a direction opposite to the projection of the cutting tool.

8. In a tool head, a housing, a spindle journalled therein and having on the end thereof a laterally projecting cutting tool, bearings for said spindle, at least one of said bearings having an inner and an outer race, means for normally holding the inner and outer races in predetermined operative position, means involving axial movement of the spindle to overcome said last-mentioned means, thereby to shift said races relative to each other for freeing the spindle from the holding action of the bearing, whereby a lateral shifting movement of the spindle within the housing is possible, and means for shifting the spindle laterally within the housing in a direction opposite to the projection of the tool.

9. In a device of the class described, a housing, a spindle journalled therein and having at one end thereof a laterally projecting tool, ball bearings for said spindle located adjacent opposite ends thereof, each of said bearings including an inner and an outer race, means for normally holding the inner and outer race of the bearing adjacent to the tool end of the spindle in operative relation, means for freeing the spindle from the holding action of the bearing adjacent to the tool, whereby a lateral shifting movement of the spindle within the housing for a retraction of the tool is possible, and means for shifting the spindle laterally within the housing in a direction opposite to the projection of the tool.

10. In a device of the class described, a housing, a spindle journalled therein and having at one end thereof a laterally projecting tool, ball bearings for said spindle located adjacent opposite ends thereof, each of said bearings including an inner and an outer race, means for normally holding the inner and outer race of the bearing adjacent to the tool end of the spindle in operative relation, means for freeing the spindle from the holding action of the bearing adjacent to the tool, whereby a lateral shifting movement of the spindle within the housing for a retraction of the tool is possible, said last means involving a relative axial movement between the inner and outer race of the bearing adjacent to the tool and means for shifting the spindle laterally within the housing in a direction opposite to the projection of the tool.

11. In a device of the class described, a housing, a spindle journalled therein and having at one end thereof a laterally projecting tool, ball bearings for said spindle located adjacent opposite ends thereof, each of said bearings including an inner and an outer race, means for applying a pre-load to said bearings for holding the spindle in predetermined position relative to the housing, means for releasing the pre-load to free the spindle from the holding action of one of said bearings, whereby a lateral shifting movement of the spindle within the housing is possible, and means for shifting the spindle laterally within the housing in a direction opposite to the projection of the tool.

12. In a device of the class described, a housing, a spindle journalled therein and having at one end thereof a laterally projecting tool, ball bearings for said spindle located adjacent opposite ends thereof, each of said bearings including an inner and an outer race, means for applying a pre-load to said bearings for holding the spindle in predetermined position relative to the housing, means for releasing the pre-load to free the spindle from the holding action of one of said bearings, whereby a lateral shifting movement of the spindle within the housing is possible, said releasing means including an hydraulically actuated plunger within the housing.

13. In a device of the class described, a housing, a spindle journalled therein and having at one end thereof a laterally projecting tool, ball bearings for said spindle located adjacent opposite ends thereof, each of said bearings including an inner and an outer race, means for applying a pre-load to said bearings for holding the spindle in predetermined position relative to the housing, means for releasing the pre-load, and means for shifting the spindle axially upon release of the pre-load to free the spindle from the holding action of one of said bearings, whereby a lateral movement of the spindle within the housing is possible.

14. In a device of the class described, a housing, a spindle journalled therein and having at one end thereof a laterally projecting tool, ball bearings for said spindle located adjacent opposite ends thereof, each of said bearings including an inner and an outer race, means for applying a pre-load to said bearings for holding the spindle in predetermined position relative to the housing, means for releasing the pre-load to free the spindle from the holding action of one of said bearings, whereby a lateral shifting movement of the spindle within the housing is possible, said releasing means including an hydraulically actuated plunger within the housing, and means for shifting the spindle laterally of the housing.

15. In a device of the class described, a housing, a spindle journalled therein and having at one end thereof a laterally projecting tool, ball bearings for said spindle located adjacent opposite ends thereof, each of said bearings including an inner and an outer race, means for applying a pre-load to said bearings for holding the spindle in predetermined position relative to the housing, means for releasing the pre-load, means for shifting the spindle axially upon release of the pre-load to free the spindle from the holding action of one of said bearings, whereby a lateral movement of the spindle within the housing is possible, and means for shifting the spindle laterally of the housing.

16. In a mechanism of the class described, a housing, a tool-carrying spindle projecting therefrom, ball bearings at opposite ends of said housing for said spindle, the bearing at the tool end being adapted to free the spindle from the holding action of its balls in response to endwise movement in one direction of said spindle, means for normally maintaining an axial pre-load in the opposite direction on said bearing, means responsive to removal of said pre-load for shifting said spindle endwise in the first-mentioned direction, and means operative on the spindle as thus freed from the holding action of said bearing to shift it laterally for a retraction of its tool from operating position.

17. In mechanism of the class described, a housing, a tool-carrying spindle projecting therefrom, ball bearings at opposite ends of said housing for said spindle, the bearing at the tool end being adapted to free the spindle from the holding action of its balls in response to endwise movement in one direction of said spindle, means normally exerting an axial pre-load on both bearings, to maintain the holding action of their balls, means responsive to removal of said pre-load for shifting said spindle endwise in a direction opposite to that of the pre-load, and means operative on the spindle as thus freed from the holding action of the bearing at its tool end for shifting it laterally to retract the tool from its working position.

18. In mechanism of the class described, a housing, a tool-carrying spindle projecting therefrom, ball bearings at opposite ends of said housing for said spindle, the bearing at the tool end being adapted to free the spindle from the holding action of its balls in response to endwise movement in one direction of said spindle, said bearing being normally pre-loaded to maintain the holding action of its balls, means rendered operative by removal of said pre-load to shift said spindle endwise in said direction, and means for procuring lateral movement of the so-freed spindle to retract its tool from operative position.

HAROLD L. BLOOD.
CHARLES L. ANDERSON.